(12) United States Patent
Jin et al.

(10) Patent No.: US 9,720,749 B2
(45) Date of Patent: Aug. 1, 2017

(54) METHOD AND APPARATUS FOR EXECUTING APPLICATION INSTALLED IN REMOTE DEVICE

(75) Inventors: Ho Jin, Yongin-si (KR); Young-chul Sohn, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 284 days.

(21) Appl. No.: 13/279,420

(22) Filed: Oct. 24, 2011

(65) Prior Publication Data

US 2012/0198483 A1    Aug. 2, 2012

(30) Foreign Application Priority Data

Feb. 1, 2011    (KR) .................. 10-2011-0010304

(51) Int. Cl.
| G06F 3/00 | (2006.01) |
| G06F 9/44 | (2006.01) |
| G06F 13/00 | (2006.01) |
| G06F 9/46 | (2006.01) |
| G06F 9/54 | (2006.01) |

(52) U.S. Cl.
CPC .................. G06F 9/547 (2013.01)

(58) Field of Classification Search
None
See application file for complete search history.

(56) References Cited

U.S. PATENT DOCUMENTS

| 7,624,367 B2* | 11/2009 | Frankle et al. ............. 716/126 |
| 2003/0117433 A1* | 6/2003 | Milton et al. ............. 345/738 |
| 2004/0024890 A1* | 2/2004 | Baek et al. ............. 709/229 |
| 2005/0120073 A1* | 6/2005 | Cho ............................ 709/201 |
| 2008/0046582 A1* | 2/2008 | Beisiegel et al. ............ 709/230 |
| 2012/0136917 A1* | 5/2012 | Abramson et al. .......... 709/203 |

FOREIGN PATENT DOCUMENTS

KR    10-2005-0051200 A    6/2005

OTHER PUBLICATIONS

Communication dated Dec. 20, 2016 issued by the Korean Intellectual Property Office in counterpart Korean Patent Application No. 10-2011-0010304.

* cited by examiner

*Primary Examiner* — Diem Cao
(74) *Attorney, Agent, or Firm* — Sughrue Mion, PLLC (57) ABSTRACT

Provided herein are methods and apparatuses for expanding a remote procedure call (RPC) shared service between devices to an application level, in which a controlled device transmits to a controller device a list of shared applications which are remotely executable from among applications installed in the controlled device, and parameter information which is related to the shared applications, and the controller device remotely executes at least one of the shared applications by using the parameter information.

13 Claims, 8 Drawing Sheets

```xml
<?xml version="1.0"?>
<root xmlns="urn:schemas-upnp-org:device-1-0">
    <specVersion>
        <major>1</major>
        <minor>0</minor>
    </specVersion>
    <device>
        <deviceType>urn:schemas-upnp-org:device:CoupledAppInvoker:1</deviceType>
        <friendlyName>Coupled App Invoker</friendlyName>
        <manufacturer>Samsung Electronics</manufacturer>
        <manufacturerURL>http://www.samsung.com</manufacturerURL>
        <modelDescription>Remote Coupled App Invoker</modelDescription>
        <modelName>CAInvoker</modelName>
        <modelNumber>1.0</modelNumber>
        <modelURL>http://www.samsung.com</modelURL>
        <serialNumber>20101129</serialNumber>
        <UDN>uuid:98766970-0361-dbae-1234-0000f07107e7</UDN>
        <UPC>783456724012</UPC>
        <serviceList>
            <service>
                <serviceType>urn:schemas-upnp-org:service:CAIConfig:1</serviceType>
                <serviceId>urn:upnp-org:serviceId:CAIConfig</serviceId>
                <SCPDURL>CAIConfig1.xml</SCPDURL>
                <controlURL>/upnp/control/CAIConfig1</controlURL>
                <eventSubURL>/upnp/event/CAIConfig1</eventSubURL>
            </service>
        </serviceList>
    </device>
</root>
```

FIG. 6A

```
<actionList>
    <action>
        <name>GetCAInvokerInfo</name>
        <argumentList>
            <argument>

<name>AppIntentDesc</name>
                <direction>out</direction>
                <relatedStateVariable>AppIntentDesc</relatedStateVariable>

</argument>
        </argumentList>
    </action>
    <action>
        <name>ExecuteCAInvoker</name>
        <argumentList>
            <argument>

<name>CAInvokerList</name>
                <direction>in</direction>

<relatedStateVariable>CAInvokerList</relatedStateVariable>
            </argument>
            <argument>
                <name>CAIResult</name>
                <direction>out</direction>
                <relatedStateVariable>CAIResult</relatedStateVariable>

</argument>
        </argumentList>
    </action>
</actionList>
```

FIG. 6B

```xml
<serviceStateTable>
        <stateVariable sendEvents="no">
                <name>AppIntentDesc</name>
                <dataType>string</dataType>
        </stateVariable>
        <stateVariable sendEvents="no">
                <name>CAInvokerList</name>
                <dataType>string</dataType>
        </stateVariable>
        <stateVariable sendEvents="no">
                <name>CAIResult</name>
                <dataType>string</dataType>
        </stateVariable>
</serviceStateTable>
```

FIG. 7

```xml
<application_list>
      <application>

<application_name>Browser</application_name>
              <application_id>0</application_id>
              <data>website_address</data>
      </application>
      <application>

<application_name>Dialer</application_name>
              <application_id>1</application_id>
              <data>telephone_number</data>
      </application>
</application_list>
```

METHOD AND APPARATUS FOR EXECUTING APPLICATION INSTALLED IN REMOTE DEVICE

CROSS-REFERENCE TO RELATED PATENT APPLICATION

This application claims priority from Korean Patent Application No. 10-2011-0010304, filed on Feb. 1, 2011 in the Korean Intellectual Property Office, the disclosure of which is incorporated herein by reference in its entirety.

BACKGROUND

1. Field

Methods and apparatuses consistent with exemplary embodiments relate to controlling a controlled device via a controller device by using a service of the controlled device in a network.

2. Description of the Related Art

Due to the development of household electric appliances such as smart phones and smart televisions (TVs), for example, the sharing of services and applications between devices has become a very significant issue.

In a control technology using a network, a Remote Procedure Call (RPC) method is generally used. In the RPC method, a controller device and a controlled device communicate according to mutually agreed command regulations, and thus, the controller device controls the controlled device. In more detail, the controller device transmits a control command, and the controlled device receives the control command and executes a local service in response to the control command.

For example, in a Digital Living Network Alliance (DLNA), Universal Plug and Play (UPnP), or RPC-based technology, command information between a control point (CP) and a service device is shared based on an Extensible Markup Language (XML), and a control command is transmitted by using an XML-based Simple Object Access Protocol (SOAP).

Figure 1:
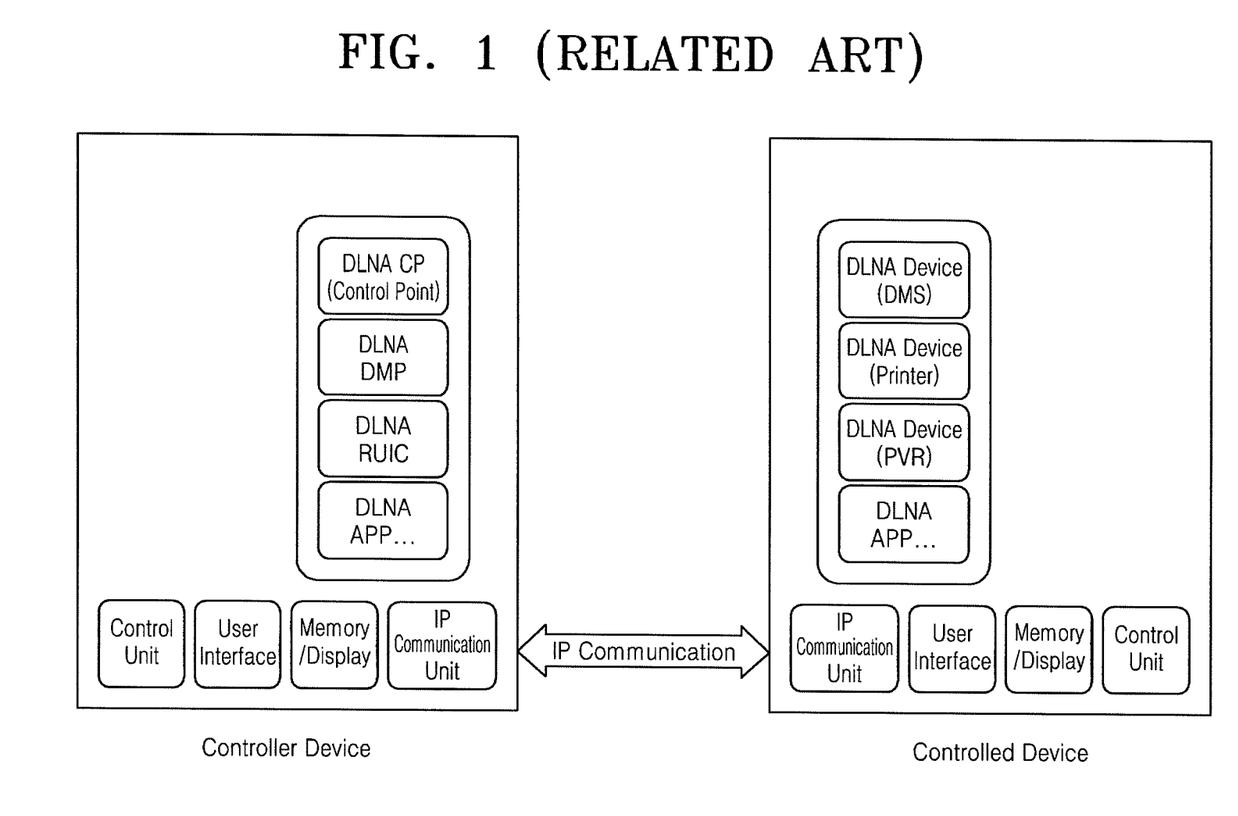
FIG. 1 is a conceptual diagram for describing a control method according to a related art DLNA technology.

FIG. 1 is a conceptual diagram for describing a control method according to a general DLNA technology. A controller device performs a DLNA discovery process and obtains information regarding DLNA devices of a controlled device and services provided by the DLNA devices. The controller device may use or shared services provided by the controlled device by invoking actions defined in the services of the DLNA devices via a SOAP message.

However, the above-described RPC method only allows sharing of previously agreed upon services. That is, a controlled device may provide to a controller device only services previously agreed before products are released. For example, even in DLNA and UPnP technologies, since a controlled device may execute only actions defined according to a standard, various applications newly installed in the controlled device may not be controlled by the controller device. Accordingly, the controller device may not be able to use services of applications installed in the controlled device.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment, there is provided a method of controlling a controlled device via a controller device, the method including: obtaining, from the controlled device, a list of shared applications, wherein the shared applications are remotely executable and are installed in the controlled device, and parameter information, wherein the parameter information is required to remotely execute the shared applications installed on the controlled device; and remotely executing, from the controller device, at least one of the shared applications installed in the controlled device using the parameter information.

The method may further include determining, at the controller device, whether the controlled device provides a remote application execution service, wherein if it is determined that the controlled device provides the remote application execution service, the obtaining of the list and the parameter information from the controlled device includes using the remote application execution service.

The obtaining may include the controller device requesting the list and the parameter information from the controlled device, wherein the requesting includes invoking at least one action defined in a Universal Plug and Play (UPnP) service description of the controlled device.

The determining may be performed based on a Universal Plug and Play (UPnP) device description of the controlled device.

According to an aspect of another exemplary embodiment, there is provided an apparatus for communicating with a controlled device via a controller device, the apparatus including: an information obtaining unit configured to obtain from the controlled device a list of shared applications, wherein the shared applications are remotely executable by the controller device and are installed in the controlled device, and parameter information, wherein the parameter information is required to remotely execute the shared applications; and an application executing unit configured to execute at least one of the shared applications installed in the controlled device using the parameter information obtained by the obtaining unit.

The apparatus may further include a service determining unit configured to determine whether the controlled device provides a remote application execution service, wherein if the service determining unit determines the controlled device provides the remote application execution service, the information obtaining unit obtains the list and the parameter information using the remote application execution service.

The information obtaining unit may request the list and the parameter information from the controlled device by invoking at least one action defined in a Universal Plug and Play (UPnP) service description of the controlled device.

The service determining unit may determine whether the controlled device provides the remote application execution service based on a Universal Plug and Play (UPnP) device description of the controlled device.

According to an aspect of another exemplary embodiment, there is provided a non-transitory computer-readable recording medium having recorded thereon a computer program for executing a method of controlling a controlled device via a controller device, the method including: obtaining, from the controlled device, a list of shared applications, wherein the shared applications are remotely executable and are installed in the controlled device, and parameter information, wherein the parameter information is required to remotely execute the shared applications installed on the controlled device; and remotely executing, from the controller device, at least one of the shared applications installed in the controlled device using the parameter information.

According to an aspect of another exemplary embodiment, there is provided method of processing a request received from a controller device by a controlled device, the method including: transmitting to the controller device a list of shared applications, wherein the shared applications are remotely executable and installed in the controlled device, and parameter information, wherein the parameter information is required to remotely execute the shared applications; and executing, at the controlled device, at least one of the shared applications according to the request received of the controller device.

The method may further include informing the controller device that the controlled device provides a remote application execution service, wherein the list and the parameter information are transmitted to the controller device using the remote application execution service.

The transmitting may be performed as a response if the controller device invokes at least one action defined in a Universal Plug and Play (UPnP) service description of the controlled device.

The informing the controller device that the controlled device provides the remote application execution service may be performed based on a UPnP device description of the controlled device.

According to an aspect of another exemplary embodiment, there is provided an apparatus for processing a request from a controller device by a controlled device, the apparatus including: an information providing unit configured to transmit to the controller device a list of shared applications, wherein the shared applications are remotely executable and are installed in the controlled device, and parameter information, wherein the parameter information is required to remotely execute the shared applications; and an application executing unit configured to execute at least one of the shared applications according to the request from the controller device.

The apparatus may further include a service informing unit configured to inform the controller device that the controlled device provides a remote application execution service, wherein the information providing unit is further configured to transmit the list and the parameter information to the controller device using the remote application execution service.

The information providing unit may be further configured to transmit the list and the parameter as a response if the controller device invokes at least one action defined in a UPnP service description of the controlled device.

The service informing unit may be further configured to inform the controller device that the controlled device provides the remote application execution service based on a UPnP device description of the controlled device.

According to an aspect of another exemplary embodiment, there is provided non-transitory computer-readable recording medium having recorded thereon a computer program for executing the method of processing a request received from a controller device by a controlled device, the method including: transmitting to the controller device a list of shared applications, wherein the shared applications are remotely executable and installed in the controlled device, and parameter information, wherein the parameter information is required to remotely execute the shared applications; and executing, at the controlled device, at least one of the shared applications according to the request received of the controller device.

The remotely executing of the shared application on the controlled device may include transmitting a Simple Object Access Protocol (SOAP) message from the controller device to the controlled device.

The remotely executing of the shared application on the controlled device may include transmitting a hypertext transfer protocol (http) request message from the controller device to the controlled device.

BRIEF DESCRIPTION OF THE DRAWINGS

The above and other features will become more apparent by describing in detail exemplary embodiments with reference to the attached drawings in which.

DETAILED DESCRIPTION

Hereinafter, exemplary embodiments of the invention will be described with reference to the attached drawings.

Figure 2:
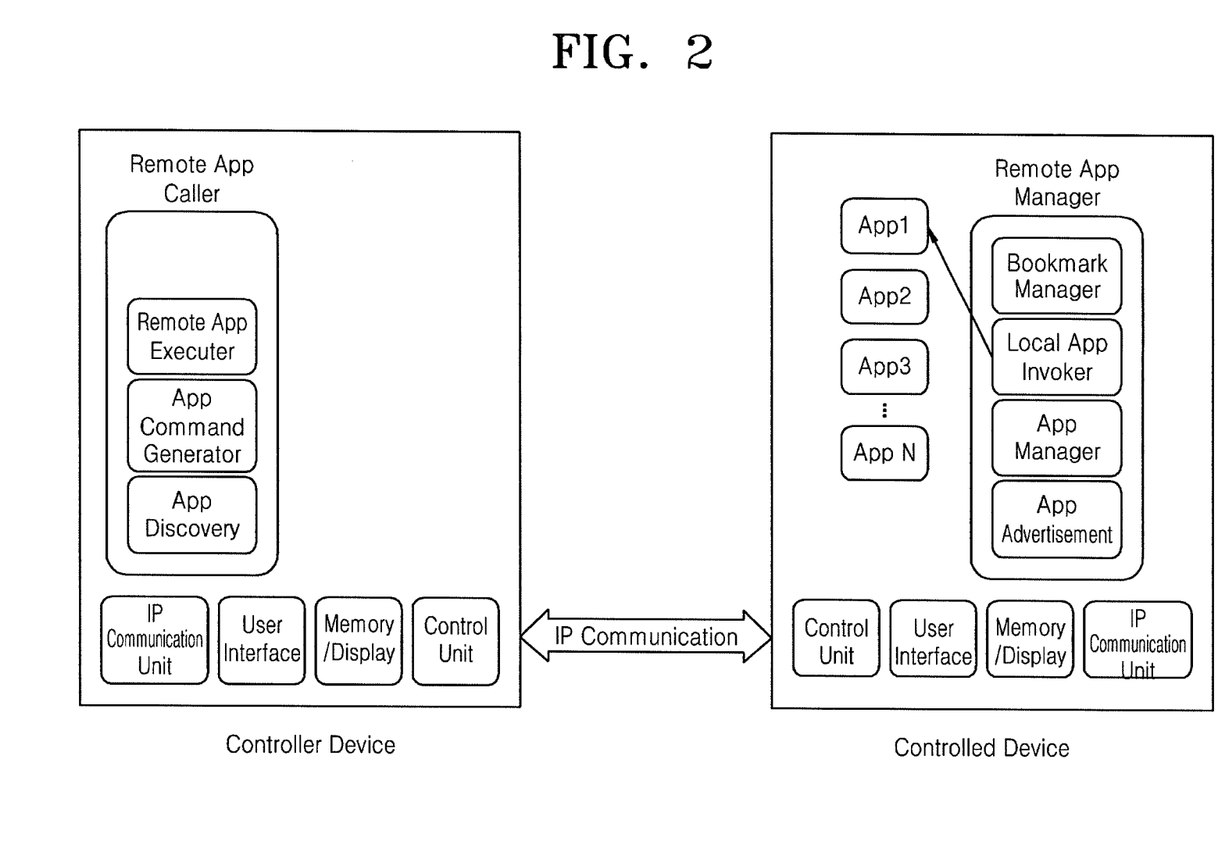
FIG. 2 is a conceptual diagram for describing a method of controlling a controlled device via a controller device, according to an exemplary embodiment.

FIG. 2 is a conceptual diagram for describing a method of controlling a controlled device via a controller device, according to an exemplary embodiment.

As illustrated in FIG. 2, the controller device includes a module for discovering the controlled device, obtaining information related to a service provided by the controlled device, and remotely executing an application installed in the controlled device (hereinafter referred to as a "remote App caller"). The controlled device includes a module for advertising the service and executing the application according to a control command received from the controller device (hereinafter referred to as a "remote App manager").

The service provides a method of remotely executing the application installed in the controlled device (hereinafter referred to as a "remote application execution service"), and the remote App caller and the remote App manager may be realized as software or hardware.

An App manager module of the remote App manager determines and registers a list of applications remotely executable by the controller device from among applications installed in the controlled device (hereinafter referred to as "shared applications") according to a user's input or a predetermined standard.

An App advertiser module of the remote App manager advertises the remote application execution service in a network, and provides the list of the shared applications and parameter information required to execute the shared applications to the controller device.

If a command for executing a shared application is received from the controller device, a local App invoker module executes the shared application installed in the controlled device. If the controller device does not command to immediately execute the shared application and only designates an execution environment or condition for executing the shared application later, a bookmark manager module stores information regarding the execution environment or condition together with related parameters.

An App discovery module of the remote App caller discovers the controlled device for providing the remote application execution service, by receiving an advertisement message, and obtains the list of the shared applications executable in the remote application execution service, and parameter information for executing the shared applications.

An App command generator module generates a control message for executing a shared application installed in the controlled device, by using the parameter information obtained by the App Discovery module.

A remote App executer module remotely executes the shared application installed in the controlled device by transmitting the control message generated by the App command generator module to the controlled device.

As described above, according to the current exemplary embodiment, since a shared service between devices expands to an application level, various services may be dynamically shared in comparison to an existing remote procedure call (RPC) method.

Figure 3:
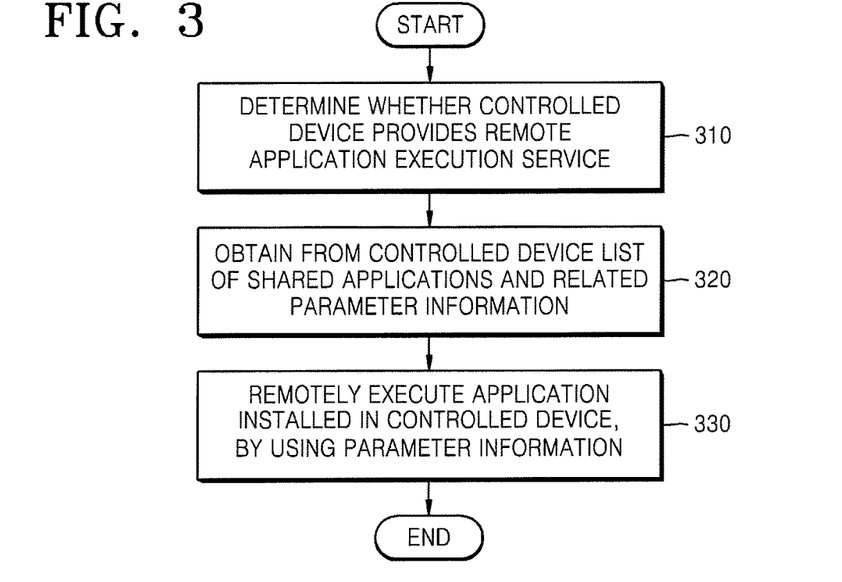
FIG. 3 is a flowchart of a process of controlling a controlled device via a controller device, according to an exemplary embodiment.

FIG. 3 is a flowchart of a process of controlling a controlled device via a controller device, according to an exemplary embodiment.

Figure 5:
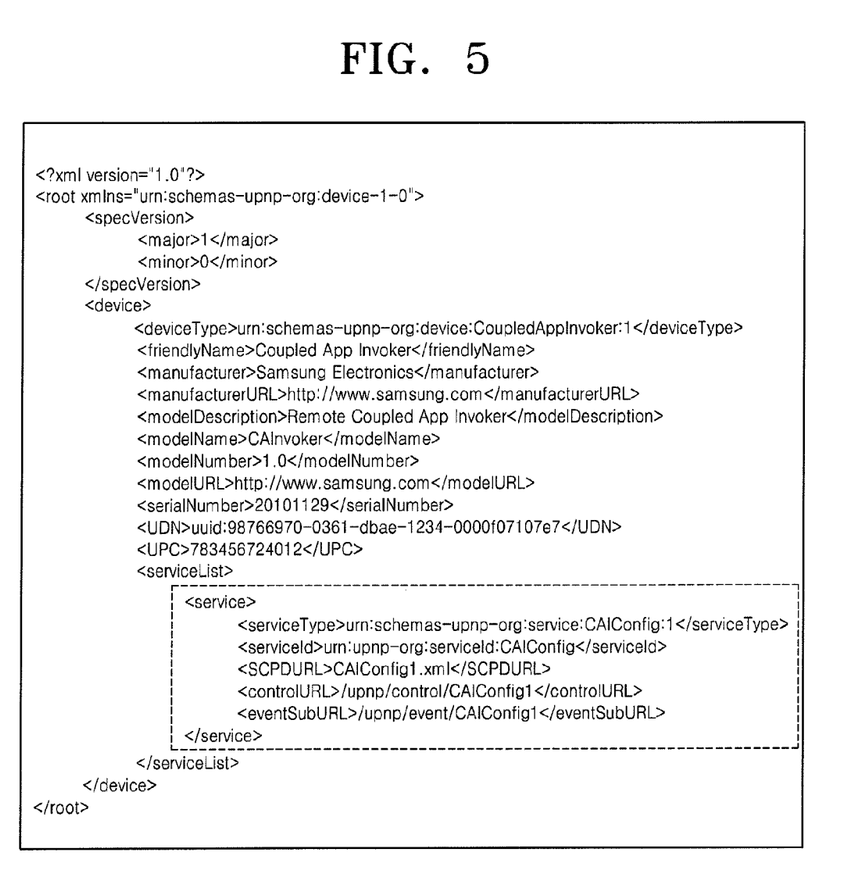
FIG. 5 is a diagram showing a UPnP device description according to an exemplary embodiment.

In operation 310, the controller device determines whether the controlled device provides a remote application execution service. The determining may be performed with reference to device information provided by the controlled device. For example, if the controller device is a universal plug and play (UPnP) CP and the controlled device is a UPnP device, the determining may be performed based on a UPnP device description of the controlled device. FIG. 5 is a diagram showing a UPnP device description according to an exemplary embodiment. In FIG. 5, a dashed box represents that a corresponding device provides a remote application execution service, and the controller device determines whether the controlled device provides the remote application execution service by checking the dashed box.

In operation 320, the controller device obtains from the controlled device a list of shared applications and parameter information for remotely executing the shared applications.

Figure 6A:
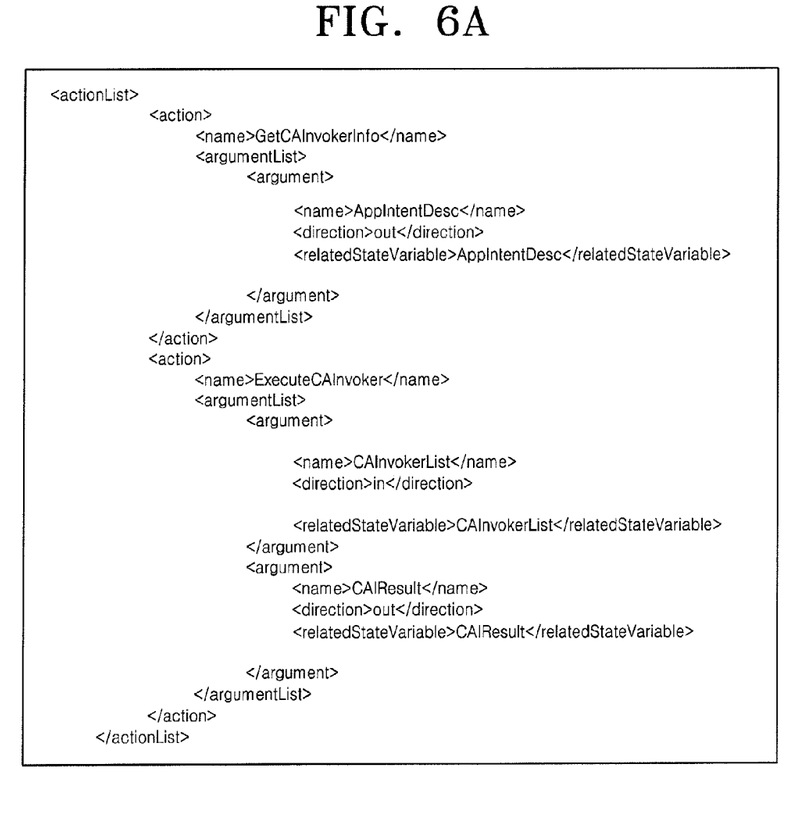
FIGS. 6A and 6B are diagrams showing a UPnP service description according to an exemplary embodiment.
Figure 6B:
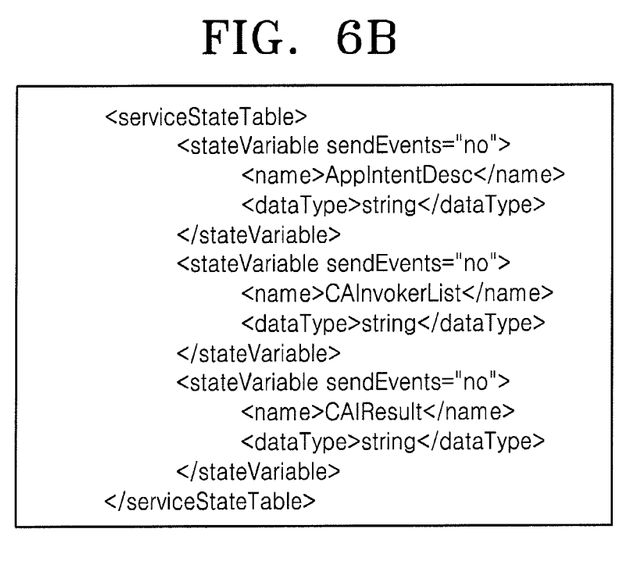
Figure 7:
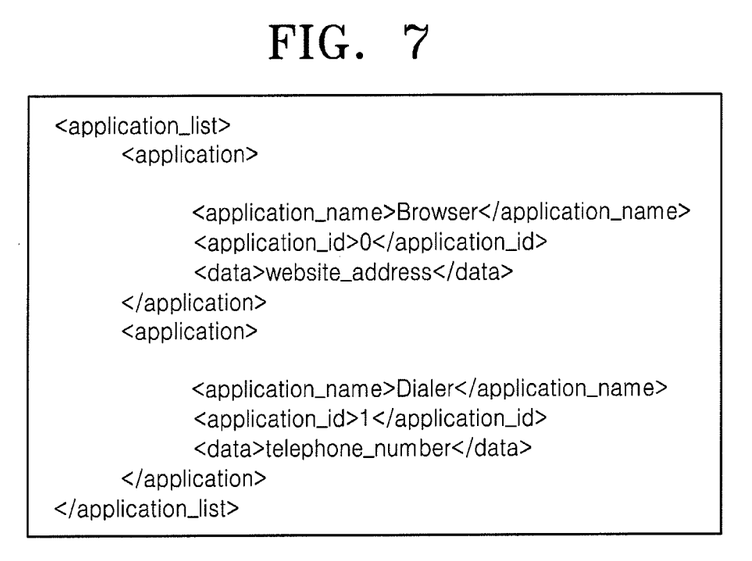
FIG. 7 is a diagram showing a list of shared applications, according to an exemplary embodiment.

For example, in a UPnP network, the obtaining may be performed by invoking an action(s) defined in the remote application execution service of the controlled device. Since information regarding the actions is defined in a UPnP service description of the controlled device, eventually, the controller device may obtain the list of the shared applications and the parameter information based on a service description of the remote application execution service of the controlled device. FIGS. 6A and 6B are diagrams showing a UPnP service description of a remote application execution service, according to an exemplary embodiment. FIG. 6A defines actions, and FIG. 6B defines state variables related to the defined actions. FIG. 7 is a diagram showing a list of shared applications, which is obtained from a controlled device as a response if a controller device invokes the GetCAInvokerInfo() action illustrated in FIG. 6A, according to an exemplary embodiment.

In operation 330, the controller device remotely executes a shared application installed in the controlled device, by using the parameter information obtained in operation 320. For example, in a UPnP network, the controller device may remotely execute a shared application of the controlled device by invoking ExecuteCAInvoker( ) action illustrated in FIG. 6A.

Although a UPnP network is exemplarily described, the current exemplary embodiment is not limited to a certain protocol. For example, in operation 330, the controller device may transmit a message of a simple object access protocol (SOAP) format to the controlled device to execute an application of the controlled device in a UPnP network. However, in another network, the controller device may execute an application of the controlled device by using an hypertext transfer protocol (http) request method (e.g., "http://PeerIPaddress:Port?AppID=;Param=").

Figure 4:
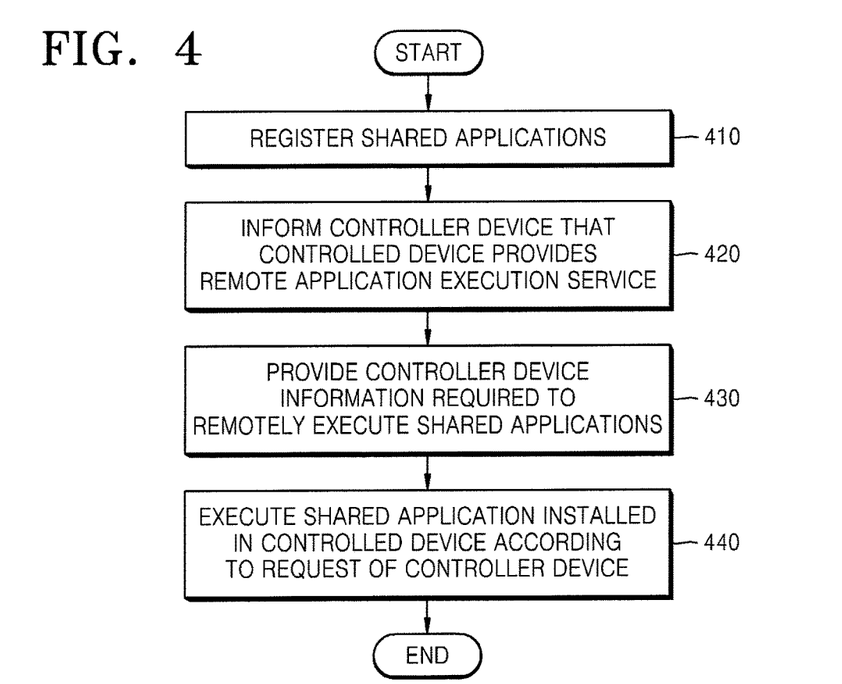
FIG. 4 is a flowchart of a process of executing an application installed in a controlled device according to a request of a controller device, according to an exemplary embodiment.

FIG. 4 is a flowchart of a process of executing an application installed in a controlled device according to a request of a controller device, according to an exemplary embodiment.

In operation 410, some or all applications installed in the controlled device are registered as shared applications remotely executable by the controller device. The shared applications may be determined according to a user's input or a predetermined standard.

In operation 420, the controlled device informs the controller device that the controlled device provides a remote application execution service. For example, in a UPnP network, the informing may be performed by providing a UPnP device description of the controlled device to the controller device.

In operation 430, the controlled device provides the controller device information required to remotely execute the shared applications. The information includes a list of the shared applications and parameter information required to execute the shared applications.

The controlled device provides the information to the controller device by using the remote application execution service. For example, in a UPnP network, if the controller device invokes the GetCAInvokerInfo() action illustrated in FIG. 6A, the controlled device provides to the controller device the information, such as illustrated in the example of FIG. 7 (i.e., the list of the shared applications and the parameter information).

In operation 440, the controlled device executes a shared application installed in the controlled device according to the request of the controller device. For example, the executing is performed as a response if the controller device invokes the ExecuteCAInvoker() action illustrated in FIG. 6A.

Meanwhile, a method of executing the shared application of the controlled device according to the request of the controller device is not limited to a certain method. For example, in an Android-based smart phone, applications may invoke each other by using an "Intent" technology; and a social networking/microblogging application, such as a "Twitter" application, may be executed by using an internal command of the following format between applications.

Intent intent=new Intent( );
intent.setAction(android.content.Intent.ACTION_SEND);
intent.setType("application/twitter");
startActivity(Intent.createChooser(intent, "Twitter"));

FIG. 5 is a diagram showing a UPnP device description according to an exemplary embodiment. As described above, in a UPnP network, a controller device may determine whether a controlled device provides a remote application execution service, by checking the device description, and more particularly, the dashed box.

FIGS. 6A and 6B are diagrams showing a UPnP service description according to an exemplary embodiment. FIG. 6A defines actions, and FIG. 6B defines state variables related to the actions. As illustrated in FIG. 6A, in the current exemplary embodiment, a remote application execution service defines two actions such as GetCAInvokerInfo() and ExecuteCAInvoker() actions. A controller device may obtain a list of shared applications and parameter information related to the shared applications by invoking the GetCAInvokerInfo() action, and may remotely execute a shared application installed in a controlled device by invoking the ExecuteCAInvoker() action.

FIG. 7 is a diagram showing a list of shared applications, according to an exemplary embodiment.

As illustrated in FIG. 7, in the current exemplary embodiment, the shared applications included two applications such as "Browser" and "dialer" applications. Various scenarios are enabled by using the applications.

For example, if a user searches for a location by using a map displayed on a mobile phone, the user may be inconvenienced because the size of a screen is too small. In this case, the user may continue searching on a screen of a television (TV) by transmitting to the TV a Uniform Resource Identifier (URI) of the map as a parameter and executing a "browser" application of the TV.

Another scenario is also enabled, as described below. If a user sees a pizza commercial and wants to order pizza while watching TV, the user does not need to make a note or memorize the number in order to call the pizza shop. Instead, the user may transmit the telephone number of the pizza shop from the TV to the mobile phone as a parameter and may execute a "dialer" application installed in the mobile phone by using a remote controller of the TV. Consequently, the mobile phone calls the pizza shop by using the "dialer" application.

Figure 8:
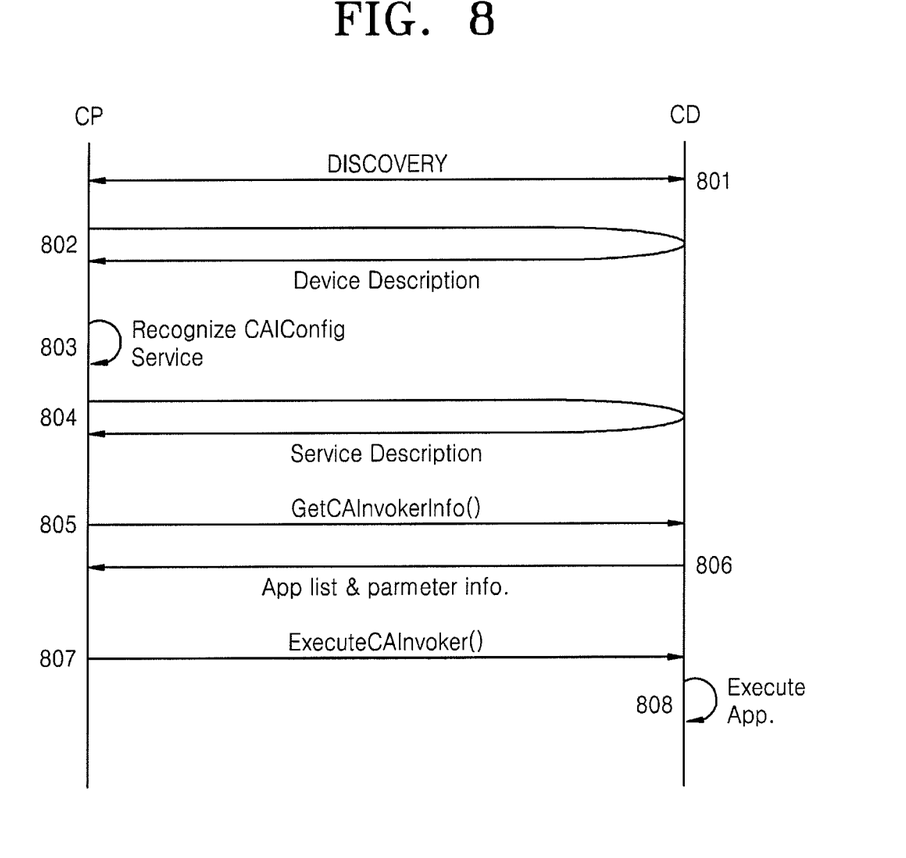
FIG. 8 is a signal flowchart of a process of remotely executing via a controller device an application installed in a controlled device, according to an exemplary embodiment.

FIG. 8 is a signal flowchart of a process of remotely executing via a controller device an application installed in a controlled device, according to an exemplary embodiment. Although a UPnP network is exemplarily described, the current exemplary embodiment is not limited to a certain protocol such as UPnP.

In operation 801, a control point (CP) discovers a controlled device (CD).

In operation 802, the CD informs the CP by using the device description illustrated in FIG. 5 that the CD provides a remote application execution service.

In operation 803, the CP recognizes that the CD provides the remote application execution service (e.g., "CAIConfig" illustrated in FIG. 5).

In operation 804, the CP obtains from the CD a service description (CAIConfig1.xml) of the remote application execution service with reference to the device description. The service description is illustrated in FIGS. 6A and 6B.

In operation 805, the CP invokes the GetCAInvokerInfo() action of the remote application execution service.

In operation 806, the CD transmits to the CP a list of shared applications and parameter information related to the shared applications as a response to the invocation of the GetCAInvokerInfo() action.

In operation 807, the CP invokes ExecuteCAInvoker() action by using the parameter information obtained in operation 806.

In operation 808, the CD executes an application installed in the CD as a response to the invocation of the ExecuteCAInvoker() action.

Figure 9:
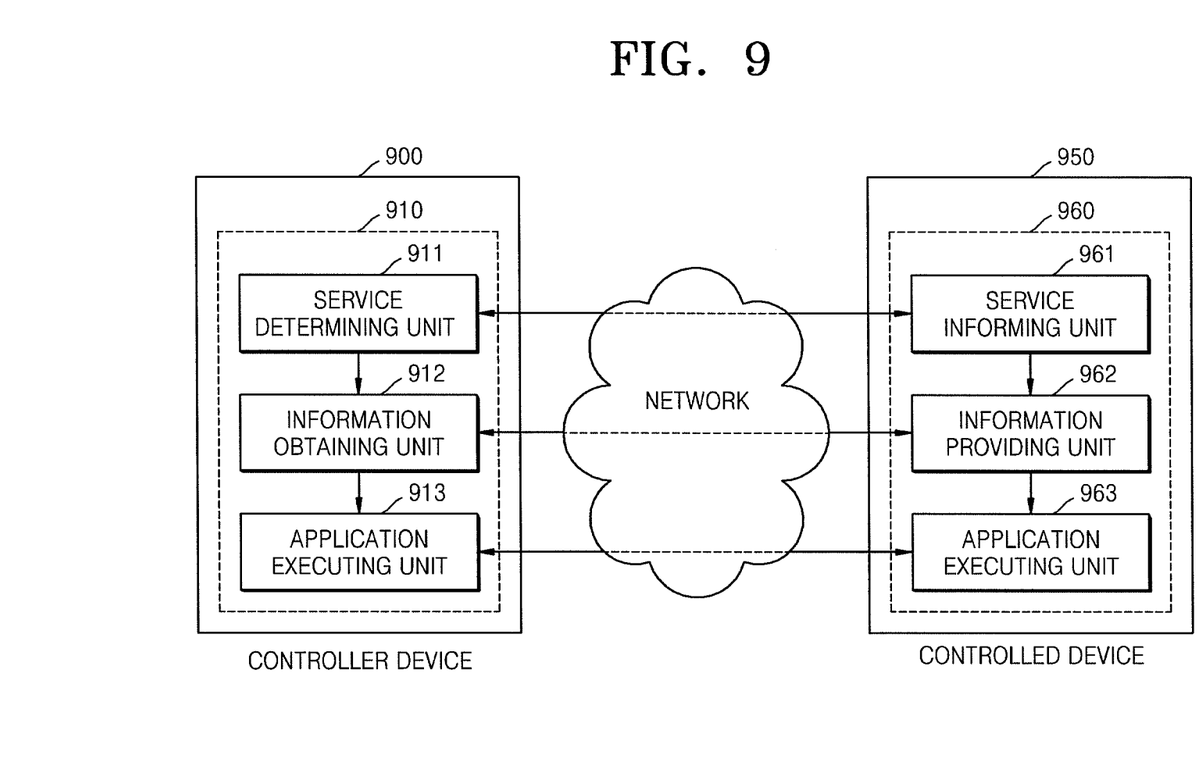
FIG. 9 is a block diagram of a controller device and a controlled device, according to an exemplary embodiment.

FIG. 9 is a block diagram of a controller device 900 and a controlled device 950, according to an exemplary embodiment.

As illustrated in FIG. 9, the controller device 900 includes a communication module 910 for communicating with the controlled device 950. The communication module 910 includes a service determining unit 911, an information obtaining unit 912, and an application executing unit 913.

The service determining unit 911 determines whether the controlled device 950 provides a remote application execution service. In a UPnP network, the determining may be performed based on a UPnP device description of the controlled device 950.

The information obtaining unit 912 obtains from the controlled device 950 a list of shared applications remotely executable from among applications installed in the controlled device 950, and parameter information required to remotely execute the shared applications. In a UPnP network, the obtaining may be performed by invoking at least one action defined in a UPnP service description of the controlled device 950.

The application executing unit 913 remotely executes an application installed in the controlled device 950, by using the parameter information obtained by the information obtaining unit 912. In a UPnP network, the executing may be performed by invoking an action(s) defined in the remote application execution service of the controlled device 950.

The controlled device 950 includes a processing module 960 for processing a request of the controller device 900. The processing module 960 includes a service informing unit 961, an information providing unit 962, and an application executing unit 963.

The service informing unit 961 informs the controller device 900 that the controlled device 950 provides a remote application execution service. In a UPnP network, the informing may be performed by transmitting a UPnP device description representing that the remote application execution service is provided, from the controlled device 950 to the controller device 900.

The information providing unit 962 transmits to the controller device 900 a list of shared applications remotely executable from among applications installed in the controlled device 950, and parameter information required to remotely execute the shared applications. In a UPnP network, the transmitting may be performed as a response if the controller device 900 invokes at least one of action defined in a service description of the remote application execution service.

The application executing unit 963 executes at least one of the shared applications according to the request of the controller device 900. In a UPnP network, the executing may be performed as a response if the controller device 900 invokes an action(s) defined in the remote application execution service of the controlled device 950.

Meanwhile, exemplary embodiments can be implemented as a hardware device such as a processor, and/or written as computer programs and implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), etc.

While exemplary embodiments have been particularly shown and described hereinabove, it will be understood by one of ordinary skill in the art that various changes in form and details may be made therein without departing from the spirit and scope of the invention as defined by the following claims. The exemplary embodiments should be considered in a descriptive sense only and not for purposes of limitation.

What is claimed is:

1. A method of controlling a controlled device via a controller device, the method comprising steps performed by the controller device:
   determining whether the controlled device provides a remote application execution service based on a device description;
   obtaining, based on the determining, a service description from the controlled device;
   obtaining, from the controlled device, a list of one or more applications which are remotely executable and are installed in the controlled device, and parameter information based on an action defined in the service description;
   generating a control message comprising at least one action defined in the service description using the obtained parameter information; and
   transmitting, to the controlled device, the control message to execute, based on the at least one action, at least one of the one or more applications installed in the controlled device.

2. The method of claim 1, wherein the determining is performed based on a Universal Plug and Play (UPnP) device description of the controlled device.

3. The method of claim 1, wherein the remotely executing the at least one of the one or more shared applications on the controlled device includes transmitting a Simple Object Access Protocol (SOAP) message from the controller device to the controlled device.

4. The method of claim 1, wherein the remotely executing the at least one of the one or more shared applications on the controlled device includes transmitting a hypertext transfer protocol (http) request message from the controller device to the controlled device.

5. The method of claim 1, wherein the one or more applications are installed in the controlled device by a user of the controlled device.

6. A controller device for communicating with a controlled device, the controller device comprising:
   a memory configured to store computer-readable instructions; and
   a processor configured to execute the computer-readable instructions, which when executed cause the processor to implement:
      a service determining unit configured to determine, based on a device description, whether the controlled device provides a remote application execution service,
      an information obtaining unit configure to obtain, based on the determining, a service description from the controlled device and a list of one or more applications which are remotely executable by the controller device and are installed in the controlled device, and parameter information which is required to remotely execute at least one of the one or more applications based on an action defined in the service description;
      a control message generation unit configured to generate a control message comprising at least one action defined in the service description using the parameter information; and
      an application executing unit configured to execute, based on the at least one action, the at least one of the one or more applications installed in the controlled device by transmitting the control message.

7. The controller device of claim 6, wherein the service determining unit determines whether the controlled device provides the remote application execution service based on a Universal Plug and Play (UPnP) device description of the controlled device.

8. A non-transitory computer-readable recording medium having recorded thereon a computer program for executing the method of claim 1.

9. A method of processing a request received from a controller device by a controlled device, the method comprising:
   informing the controller device that the controlled device provides a remote application execution service by providing a device description to the controller device;
   transmitting a service description to the controller device;
   transmitting to the controller device a list of one or more applications which are remotely executable and installed in the controlled device, and parameter information in response to an invocation of an action defined in the service description;
   receiving, from the controller device, a control message comprising at least one action defined in the service description; and
   executing, based on the at least one action, at least one of the one or more applications in response to a receipt of the control message from the controller device.

10. The method of claim 9, wherein the informing the controller device that the controlled device provides the remote application execution service is performed based on a UPnP device description of the controlled device.

11. A controlled device for processing a request from a controller device, the controlled device comprising:
   a memory configured to store computer-readable instructions; and
   a processor configured to execute the computer-readable instructions, which when executed cause the processor to implement:
      a service informing unit configured to inform the controller device that the controlled device provides a remote application execution service by providing a device description to the controller device;
      an information providing unit configured to transmit a service description to the controller device and to transmit to the controller device a list of one or more applications which are remotely executable and are installed in the controlled device, and parameter information in response to an invocation of an action defined in the service description;
      a control message receiving unit configured to receive, from the controller device, a control message comprising at least one action defined in the service description; and
      an application executing unit configured to execute, based on the at least one action, at least one of the one or more applications in response to a receipt of the control message from the controller device.

12. The controlled device of claim 11, wherein the service informing unit is further configured to inform the controller device that the controlled device provides the remote application execution service based on a UPnP device description of the controlled device.

13. A non-transitory computer-readable recording medium having recorded thereon a computer program for executing the method of claim 9.

* * * * *